United States Patent [19]

Moeller

[11] 4,422,414

[45] Dec. 27, 1983

[54] PISTON AND CYLINDER ARRANGEMENT INCLUDING MEANS TO VARY THE COMPRESSION RATIO

[75] Inventor: Frank Moeller, Caterham, England

[73] Assignee: John Douglas Rees, Orpington, England

[21] Appl. No.: 281,625

[22] Filed: Jul. 9, 1981

[30] Foreign Application Priority Data

Jul. 18, 1980 [GB] United Kingdom ............... 8023616

[51] Int. Cl.³ ............................................. F02B 75/04
[52] U.S. Cl. .............................. 123/48 B; 123/53 A; 123/56 AC; 123/72
[58] Field of Search ................. 123/48 R, 48 B, 78 R, 123/78 B, 53 R, 53 A, 56 R, 56 B, 56 BA, 56 BB, 56 BC, 193 R, 193 P, 197 AB, 197 AC, 197 R

[56] References Cited

U.S. PATENT DOCUMENTS

| 1,056,746 | 3/1913 | Pitts | 123/53 B |
|---|---|---|---|
| 1,208,854 | 12/1916 | Stitt | 123/48 B |
| 3,537,437 | 11/1970 | Paul et al. | 123/197 R |
| 4,094,278 | 6/1978 | Franke | 123/72 |
| 4,140,091 | 2/1979 | Showers | 123/78 E |
| 4,331,111 | 5/1982 | Bennett | 123/56 R |

FOREIGN PATENT DOCUMENTS 293694 2/1932 Italy ...................................... 123/72

Primary Examiner—Craig R. Feinberg
Attorney, Agent, or Firm—Sughrue, Mion, Zinn, Macpeak and Seas

[57] ABSTRACT

A piston which is reciprocable within a cylinder is rigidly connected to a bearing housing by a connection. The connection comprises a rigid tube fixed to the piston and a rigid rod fixed to the housing which extends within the tube coaxially thereof. The tube has an internal thread which engages with an external thread on the rod such that rotation of the tube changes the length of the connection and hence the position of the piston within its cylinder. The tube is rotated by way of a worm spindle which engages with longitudinal grooves formed on the external surface of the tube. The arrangement can be used particularly to vary the compression ratio of an internal combustion engine having a counter rotating crank drive.

4 Claims, 4 Drawing Figures

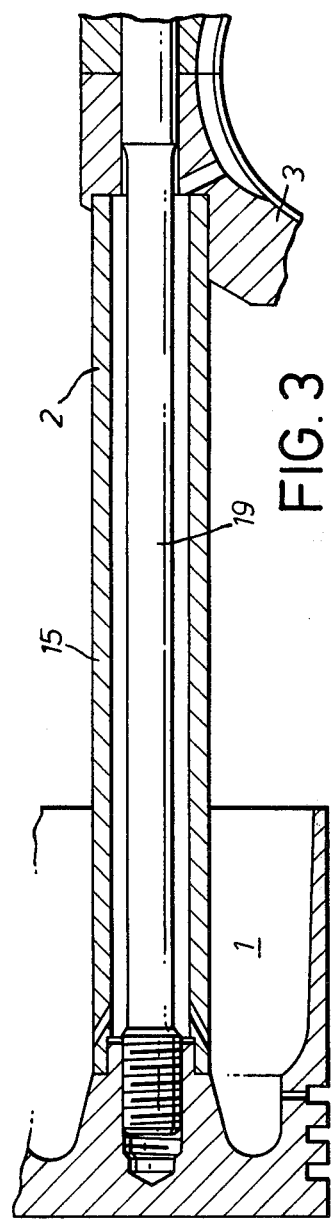
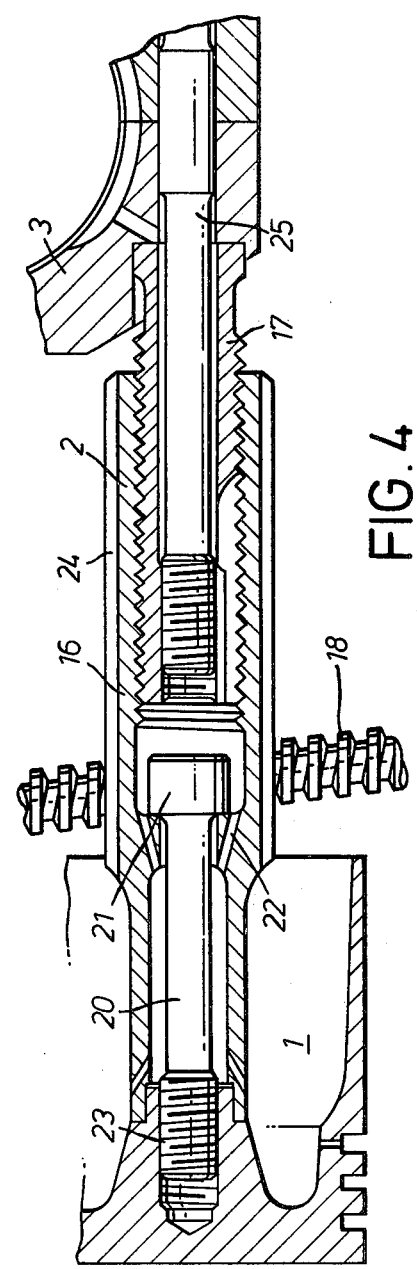

PISTON AND CYLINDER ARRANGEMENT INCLUDING MEANS TO VARY THE COMPRESSION RATIO

FIELD OF THE INVENTION

The present invention relates to a piston and cylinder arrangement including means to vary the compression ratio thereof particularly for use in an internal combustion engine having a counter rotating crank drive.

SUMMARY OF THE INVENTION

According to the present invention there is provided an arrangement comprising a piston and cylinder assembly, the piston being reciprocable within the cylinder, and connecting means extending axially of the piston and cylinder assembly and connecting the piston to a bearing housing, said connecting means comprising a rigid tube connected to one of the piston and housing, and a rigid rod connected to the other of the piston and the housing, the rod extending coaxially within the tube, interengaging means provided internally of the tube and externally of the rod and arranged to cause relative longitudinal movement of the rod and the tube upon relative rotation thereof, and means for causing relative rotation of the rod and the tube whereby the position of the piston within the cylinder is adjustable and the compression ratio of the piston and cylinder assembly is variable.

In an arrangement of the invention the compression ratio can be varied simply by causing relative rotation of the tube and the rod. Preferably, the means for causing relative rotation of said rod and said tube comprises longitudinally extending grooves on the external surface of said tube and a worm spindle engaged with said grooves. The worm spindle may be rotated manually or by any suitable means which can be controlled externally of the arrangement.

An internal combustion engine having a counter rotating crank drive can easily be provided with arrangements of the invention as the pistons thereof are rigidly connected to the big end bearing housing.

The present invention also extends to an internal combustion engine comprising two pairs of working piston and cylinder assemblies disposed opposite to one another, the piston and cylinder assemblies of each pair being disposed adjacent each other with their longitudinal axes parallel and communicating with a common combustion chamber, a counter rotating crank drive having an inner crank carrying an eccentric for driving the pistons, the eccentric being rotatable within a big end bearing housing, each piston being rigidly connected to said bearing housing, wherein at least one piston of each pair of piston and cylinder assemblies is connected to said bearing housing by respective connecting means extending axially of said piston, each said connecting means comprising a rigid tube connected to one of the piston and the housing, and a rigid rod connected to the other of the piston and the housing, the rod extending coaxially within the tube, interengaging means provided internally of the tube and externally of the rod and arranged to cause relative longitudinal movement of the rod and the tube upon relative rotation thereof, and means for causing relative rotation of the rod and the tube whereby the position of the piston within its cylinder is adjustable and the compression ratio of the pair of piston and cylinder assemblies is variable.

In an embodiment of the engine, the tube is fixed to the piston and the rod is fixed to the big end bearing housing. The interengaging means may then comprise an internal thread on the tube and an external thread on the rod. The means for causing relative rotation of the rod and the tube comprises longitudinally extending grooves on the external surface of the tube and a worm spindle engaged with said grooves. The worm spindle may be rotated manually. However, in a preferred embodiment the worm spindle is rotatable by suitable means controllable externally of the engine. Thus, the compression ratio can be varied whilst the engine is running. In this case, the compression ratio can be varied in dependence upon the running condition of the engine to provide maximum efficiency. In all cases, it will be appreciated that it is not necessary to strip down the engine in order to make the required adjustments.

Preferably, one piston of each pair is connected to said bearing housing by said respective connecting means and the other piston of each pair is connected to said bearing housing by a rigid tube fixed to said piston and the housing and extending axially of said piston, an anti-fatigue bolt extending axially within said tube over the whole length thereof, said anti-fatigue bolt being prestressed to keep the tube under compression.

In an embodiment, a respective scavenging piston and cylinder assembly is associated with the common combustion chamber of each pair of working piston and cylinder assemblies, each said scavenging piston and cylinder assembly being arranged adjacent the working piston and cylinder assembly of the respective pair provided with inlet ports, and wherein the longitudinal axes of said scavenging piston and cylinder assemblies are aligned, the longitudinal axis of each scavenging assembly being at an angle between 20° and 50° relative to the longitudinal axis of the associated pair of working piston and cylinder assemblies. It has been found that by positioning the longitudinal axis of the scavenging assembly at an angle between 20° and 50°, preferably 36°, to that of the associated pair of working piston and cylinder assemblies a particularly compact engine results.

The counter rotating crank drive may also comprise a further eccentric carried on said inner crank adjacent said first-mentioned eccentric for driving said scavenging pistons, two inner balance weights each carried by said inner crank and spaced on either side of said eccentrics, two outer crankshafts each having an eccentrically arranged bearing receiving one end of said inner crank, each outer crankshaft carrying an outer balance weight, and a gear carried at each end of the inner crank and engaged with a respective gear carried by the adjacent outer crankshaft, the ratio of each gear on the inner crank to the engaging gear on the outer crankshaft being 2:1. The inner crank will thus have a speed of rotation which is twice that of the outer crankshafts.

BRIEF DESCRIPTION OF THE DRAWINGS

An embodiment of the present invention will hereinafter be described, by way of example, with reference to the accompanying drawings, in which:

FIG. 3 shows the connection of one piston to the big end bearing of the engine of FIGS. 1 and 2, and FIG. 4 shows the connection of a second piston to the big end bearing of the engine, this connection including means for varying the compression ratio of the engine.

DESCRIPTION OF A PREFERRED EMBODIMENT

Figure 1:
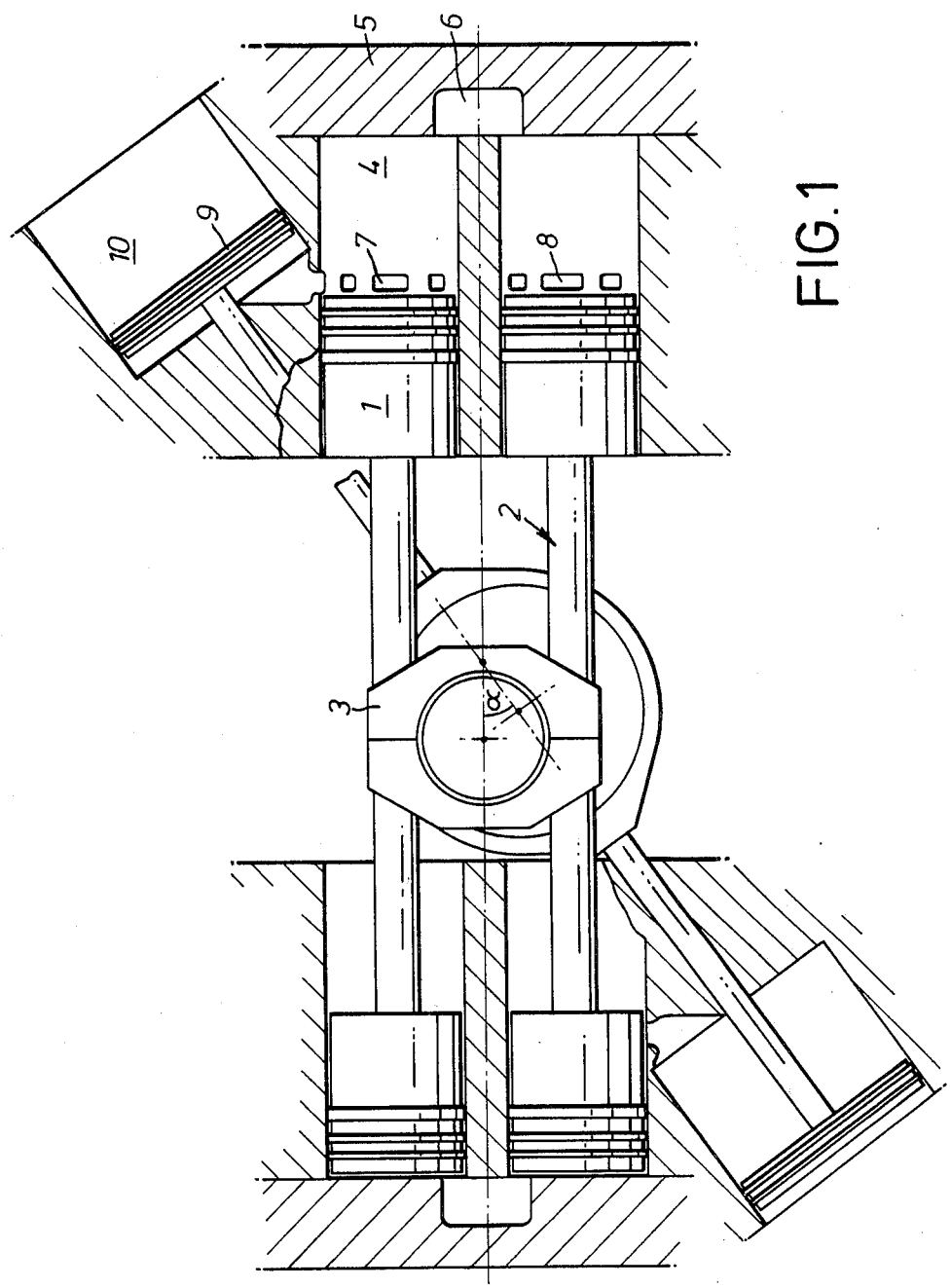
FIG. 1 shows a cross-section of an internal combustion engine incorporating a counter rotating crank drive.

The internal combustion engine shown in the drawings includes a counter rotating crank drive which converts reciprocating motion into rotary motion with good dynamic balance such that vibration is minimized.

Figure 2:
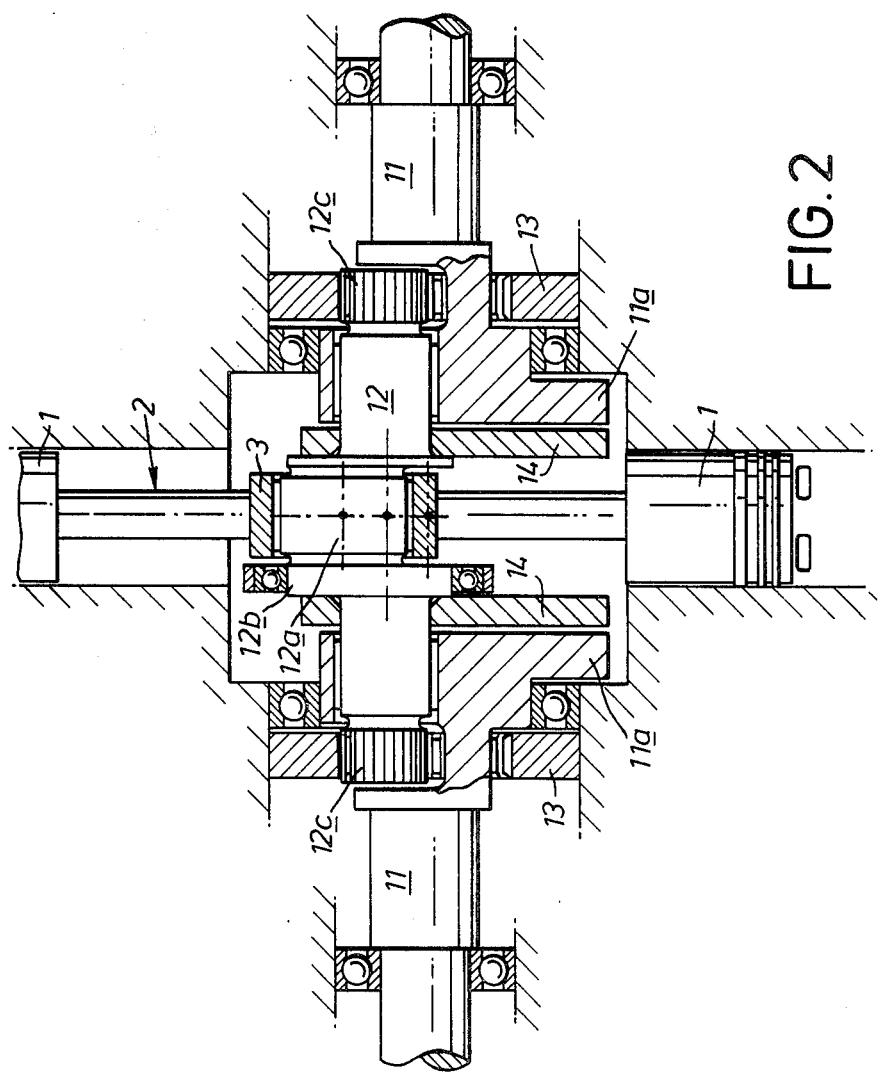
FIG. 2 shows a longitudinal section of the engine of FIG. 1.

As is shown in FIGS. 1 and 2 the engine comprises four pistons 1 slidable within respective cylinders 4. The working piston and cylinder assemblies 1, 4 are arranged in two pairs disposed opposite to each other. The piston and cylinder assemblies 1, 4 of each pair are disposed adjacent each other and have a common combustion chamber 6 formed in a common cylinder head 5. The combustion chamber 6 is designed in dependence upon the fuel to be used and the manner of its ignition. As designs for combustion chambers are well known and as the design of the combustion chamber is not pertinent to the present invention it will not be further described herein.

One cylinder 4 of each pair is provided with inlet ports 7 for air or an air/fuel mixture and the other cylinder 4 of the pair is provided with exhaust ports 8. A scavenging piston 9 slidable within a scavenging cylinder 10 is associated with each pair of working piston and cylinder assemblies 1, 4 and is arranged to pump air or the air/fuel mixture to the inlet ports 7. The valves and/or ports of the scavenging piston and cylinder assembly 9, 10 are not illustrated and will not be described herein as their arrangement will be clear to any one skilled in the art. The scavenging piston and cylinder assembly 9, 10 is disposed adjacent the cylinder 4 which includes the inlet ports 7. As is clearly shown in FIG. 1 the longitudinal axis of the scavenging piston and cylinder assembly 9, 10 is disposed at an angle $\alpha$ relative to the common longitudinal axis of the asociated pair of working piston and cylinder assemblies 1, 4. The angle $\alpha$ is in the range 20° to 50° and is chosen such that the engine is as compact as possible and to ensure that the engine is dynamically balanced. The longitudinal axis of the scavenging piston and cylinder assembly 9, 10 and the common axis of the pair of working piston and cylinder assemblies 1, 4 meet at the crankshaft centre line of the engine.

It will be seen that each working piston and cylinder assembly 1, 4 of one pair is accurately aligned with a respective working piston and cylinder assembly 1, 4 of the other pair and that the two scavenging piston and cylinder assemblies 9, 10 and accurately aligned with each other. Each working piston 1 is rigidly connected to a big end bearing housing 3 by way of a connection 2 which is described further hereinbelow.

FIG. 2 shows a longitudinal section of the engine and illustrates the crank drive. The working pistons 1 are rigidly connected to the big end bearing housing 3 and are driven by an eccentric 12a carried on an inner crank 12. Similarly, the scavenging pistons 9 are driven by an eccentric 12b of the inner crank 12. The two eccentrics 12a and 12b are disposed at an angle 2$\alpha$ relative to each other. The inner crank 12 also carries inner balance weights 14 which are disposed directly against the eccentrics 12a and 12b and are arranged to balance the weight of the piston and cylinder assemblies. The inner crank 12 is eccentrically journalled in two outer crankshafts 11 which are each rotatably mounted by way of rolling contact bearings. As is clearly shown in FIG. 2, each main journal of the inner crank 12 is supported in a respective plain bearing positioned eccentrically in the inner end of the respective outer crankshaft 11.

An externally toothed spur or helical gear 12c is rigidly connected to each outer end of the inner crank 12 outwardly of the rolling contact bearing journalling the inner crank 12 in the respective outer crankshaft 11. Each gear 12c, which is accommodated in a cut out provided in the respective outer crankshaft 11, engages a respective stationary internally toothed ring gear 13. Each crankshaft 11 carries a respective balance weight 11a arranged to counteract any out of balance forces acting on the outer crankshaft 11.

It will be appreciated that, in operation, the inner crank 12 rotates in the opposite direction to the direction of rotation of the two outer crankshafts 11. As is known, the gear ratio of the helical gear 12c to the ring gear 13 is 2:1 such that the inner crank 12 rotates at twice the speed of the outer crankshafts 11. The geometric centres of the eccentrics 12a and 12b reciprocate along a straight line and the pistons 1,9 of the working and scavenging piston and cylinder assemblies accurately reciprocate along their respective axes. As the arrangement and operation of a counter rotating crank drive is well known and documented it will not be further described herein. It will be appreciated that such a drive can be completely dynamically balanced.

In the engine illustrated in the drawings, the working piston and cylinder assemblies are connected to the big end bearing of the engine by means enabling the compression ratio of the engine to be varied.

It is advantageous if the compression ratio of an internal combustion engine can be varied easily. For example, a diesel engine can be started with less effort if it is turned over at a low compression ratio and the compression ratio is then raised to achieve firing. After starting, a lower compression ratio will provide quieter and more even running of the engine. It will also be appreciated that the compression ratio of a petrol engine could be chosen in accordance with the grade of petrol to be used such that the engine runs at maximum efficiency.

FIGS. 3 and 4 illustrate the connection 2 of the working piston and cylinder assemblies 1, 4 to the big end bearing housing 3 of the engine. The arrangement shown in FIG. 4 incorporates means for varying the compression ratio. Generally, one piston 1 of each pair of working piston and cylinder assemblies 1, 4 is connected to the housing 3 as shown in FIG. 3 whilst the other piston 1 of the pair of assemblies 1, 4 is connected as shown in FIG. 4.

As is shown in FIG. 3, one piston 1 is rigidly connected to the big end bearing housing 3 by way of a con rod which comprises a rigid tube 15 extending into the piston 1. A pre-tensioned anti-fatigue bolt 19 extends within the tube 15 coaxially thereof and is arranged to keep the tube 15 under compression at all times regardless of the load and the direction of the load on the piston 1.

The adjacent piston 1 is connected to the housing 3 by way of a rigid tube 16 rigidly connected within the piston 1 as shown in FIG. 4. An anti-fatigue bolt 20 extends within the end of the tube 16 within the piston 1 coaxial therewith. The bolt 20 has a head 21 at one end engaged on an internal shoulder 22 of the tube 16. The other end of the bolt 20 engages in a bore 23 within the piston 1. The length of the tube 16 extending outwardly of the piston 1 has longitudinally extending grooves 24 provided on its external surface. In addition, the tube 16 is provided with an internal thread. An externally threaded hollow rod 17 rigidly connected to the big end bearing housing 3 extends within the tube 16 coaxially thereof such that its external thread engages with the internal thread of the tube 16. An anti-fatigue bolt 25 rigidly engaged within the housing 3 extends within the rod 17 coaxially thereof. A worm spindle 18 having teeth which mate with the external grooves 24 of the tube 16 is provided. The work spindle 18 is set at an angle equal to its pitch angle. Rotation of the worm spindle 18 rotates the tube 16 and the piston 1 about the longitudinal axis.

It will be appreciated that relative rotation of the tube 16 and the rod 17 will cause relative longitudinal movement thereof and thus change the length of the connection 2 between the piston 1 and the big end bearing housing 3. Hence the position of the piston 1 within the cylinder 4 will be altered and the compression ratio will be changed. Furthermore, as the piston and cylinder assembly has a combustion chamber 6 common to the adjacent piston and cylinder assembly the compression ratio of the adjacent assembly, is correspondingly changed.

The tube 16 does not rotate relative to the rod 17 during reciprocating motion of the piston 1 and hence the compression ratio can only be varied by rotating the worm spindle 18. In this respect a friction or positive lock device (not shown) may be provided to lock the worm spindle 18 against rotation. Furthermore, means (not shown) are provided to rotate the worm spindle 18 when required. These means may be mechanical, hydraulic or electric and may be provided with control means external of the engine. Alternatively, control means may be provided to rotate the worm spindle 18 automatically in dependence upon one or more operating parameters of the engine. Stops (not shown) are provided to define end positions for the spindle 18 and thus to define the minimum and maximum compression ratios.

The length and position of the grooves 24 on the external surface of the tube 16 is chosen such that the piston 1 can still reciprocate freely over its entire stroke.

Whilst the invention has been described above with particular reference to an internal combustion engine incorporating a counter rotating crank drive it is not restricted to this application. Thus, the invention can be used to vary the compression ratio of any piston and cylinder assembly where the piston is connected to a bearing housing. For example, the invention can be used with pumps and compressors.

I claim:

1. An internal combustion engine, comprising a first pair of working piston (1) and cylinder (4) assemblies disposed adjacent each other with their longitudinal axes parallel, a common combustion chamber (6) communicating with the cylinders of the pair of piston and cylinder assemblies, a big end bearing housing (3) to which each piston is rigidly connected, and a counter rotating crank drive having an inner crank (12), an eccentric (12a) being carried on the inner crank and being arranged to drive the pistons, the eccentric being rotatable within said big end bearing housing, and further comprising connecting means (2) connecting at least one piston of the pair of piston and cylinder assemblies to said bearing housing, said connecting means extending axially of said piston, said connecting means comprising a rigid tube (16) connected to one of the piston and the housing, and a rigid rod (17) connected to the other of the piston and the housing, the rod extending coaxially within the tube, interengaging means provided internally of the tube and externally of the rod and arranged to cause relative longitudinal movement of the rod and the tube upon relative rotation thereof, and means for causing relative rotation of the rod and the tube to selectively adjust the position of the piston within its cylinder and thereby vary the compression ratio of the pair of piston and cylinder assemblies, said means for causing relative rotation of said rod and said tube comprising longitudinally extending grooves (24) on the external surface of said tube and a worm spindle (18) engaged with said grooves, wherein a second pair of working piston and cylinder assemblies is disposed opposite to said first pair, and wherein one piston of each pair is connected to said bearing housing by respective connecting means and the other piston of each pair is connected to said bearing housing by a rigid tube (15) fixed to said piston and the housing and extending axially of said piston, an anti-fatigue bolt (19) extending coaxially within said tube over the whole length thereof, said anti-fatigue bolt being prestressed to keep the tube under compression, and further comprising a respective scavenging piston (9) and cylinder assembly (10) associated with the common combustion chamber of each pair of working piston and cylinder assemblies, each said scavenging piston and cylinder assembly being arranged adjacent the working piston and cylinder assembly of the respective pair provided with inlet ports (7), and wherein the longitudinal axes of said scavenging piston and cylinder assemblies are aligned, the longitudinal axis of each scavenging assembly being at an angle between 20° and 50° relative to the longitudinal axis of the associated pair of working piston and cylinder assemblies.

2. An internal combustion engine according to claim 1, wherein said tube is fixed to said piston and said rod is fixed to said bearing housing, and wherein said interengaging means comprise an internal thread on said tube and an external thread on said rod.

3. An internal combustion engine according to claim 1, wherein said counter rotating crank drive further comprises a further eccentric (12b) carried on said inner crank adjacent said first-mentioned eccentric for driving said scavenging pistons, two inner balance weights (14) each carried by said inner crank and spaced on either side of said eccentrics, two outer crankshafts (11) each having an eccentrically arranged bearing receiving one end of said inner crank, each outer crankshaft carrying an outer balance weight (11a), and a gear (12c) carried at each end of the inner crank and engaged with a respective gear (13) carried by the adjacent outer crankshaft, the ratio of each gear on the inner crank to the engaging gear on the outer crankshaft being 2:1.

4. An internal combustion engine, comprising: two pairs of working piston (1) and cylinder (4) assemblies disposed opposite to one another, the piston and cylinder assemblies of each pair being disposed adjacent each other with their longitudinal axes parallel, a common combustion chamber (6) communicating with the cylinders of each pair of piston and cylinder assemblies, a big end bearing housing (3) to which each piston is rigidly connected, and a counter rotating crank drive having an inner crank (12), an eccentric (12a) being carried on the inner crank and being arranged to drive the pistons, the eccentric being rotatable within said big end bearing housing, and further comprising connecting means (2) connecting at least one piston of each pair of piston and cylinder assemblies to said bearing housing, said connecting means extending axially of said piston, each said connecting means comprising a rigid tube (16) connected to one of the piston and the housing, and a rigid rod (17) connected to the other of the piston and the housing, the rod extending coaxially within the tube, interengaging means provided internally of the tube and externally of the rod and arranged to cause relative longitudinal movement of the rod and the tube upon relative rotation thereof, and means (18, 24) for causing relative rotation of the rod and the tube whereby the position of the piston within its cylinder is adjustable and the compression ratio of the pair of piston and cylinder assemblies is variable, further comprising a respective scavenging piston (9) and cylinder assembly (10) associated with the common combustion chamber of each pair of working piston and cylinder assemblies, each said scavenging piston and cylinder assembly being arranged adjacent the working piston and cylinder assembly of the respective pair provided with inlet ports (7), and wherein the longitudinal axes of said scavenging piston and cylinder assemblies are aligned, the longitudinal axis of each scavenging assembly being at an angle between 20° and 50° relative to the longitudinal axis of the associated pair of working piston and cylinder assemblies, wherein said counter rotating crank drive further comprises a further eccentric (12b) carried on said inner crank adjacent said first-mentioned eccentric for driving said scavenging pistons, two inner balance weights (14) each carried by said inner crank and spaced on either side of said eccentrics, two outer crankshafts (11) each having an eccentrically arranged bearing receiving one end of said inner crank, each outer crankshaft carrying an outer balance weight (11a), an a gear (12c) carried at each end of the inner crank and engaged with a respective gear (13) carried by the adjacent outer crankshaft, the ratio of each gear on the inner crank to the engaging gear on the outer crankshaft being 2:1.

* * * * *